United States Patent [19]
Forg et al.

[11] 3,805,537
[45] Apr. 23, 1974

[54] HELIUM-ENRICHED HELIUM-HYDROGEN MIXTURE USING METHANE TO SCRUB OUT RESIDUAL NITROGEN

[75] Inventors: Wolfgang Forg; Wolfgang Schmid, both of Grunwald, Germany

[73] Assignee: Linde Aktiengesellschaft, Munich, Germany

[22] Filed: Feb. 26, 1971

[21] Appl. No.: 119,126

[30] Foreign Application Priority Data
Aug. 13, 1970 Germany.......................... 2040372

[52] U.S. Cl............................. 62/22, 62/13, 62/28
[51] Int. Cl............................. F25j 1/02, F25j 3/02
[58] Field of Search ............... 62/12, 13, 17, 23, 24, 62/27, 28; 252/376, 377; 423/359

[56] References Cited
UNITED STATES PATENTS

| | | |
|---|---|---|
| 2,545,778 | 3/1951 | Haringhuizen.......................... 62/22 |
| 3,092,461 | 6/1963 | Vander Arend........................ 62/18 |
| 3,543,529 | 12/1970 | Knapp.................................... 62/22 |
| 3,021,682 | 2/1962 | Baker..................................... 62/17 |
| 2,993,342 | 7/1961 | Koble..................................... 62/22 |
| 3,148,966 | 9/1964 | Kitchen.................................. 62/23 |
| 3,355,902 | 12/1967 | Crawford............................... 62/28 |
| 3,626,448 | 12/1971 | Crawford............................... 62/28 |

Primary Examiner—Norman Yudkoff
Assistant Examiner—Arthur F. Purcell
Attorney, Agent, or Firm—Millen, Raptes & White

[57] ABSTRACT

For the production of helium, a helium-containing vent gas from an ammonia synthesis gas is used as the starting material. The vent gas is subjected to several partial condensation steps and is scrubbed with methane to remove residual nitrogen. Any entrained methane is removed in adsorbers. A stripping column is preferably employed to obtain pure liquid hydrogen and a gaseous helium-hydrogen mixture further enriched in helium.

11 Claims, 1 Drawing Figure

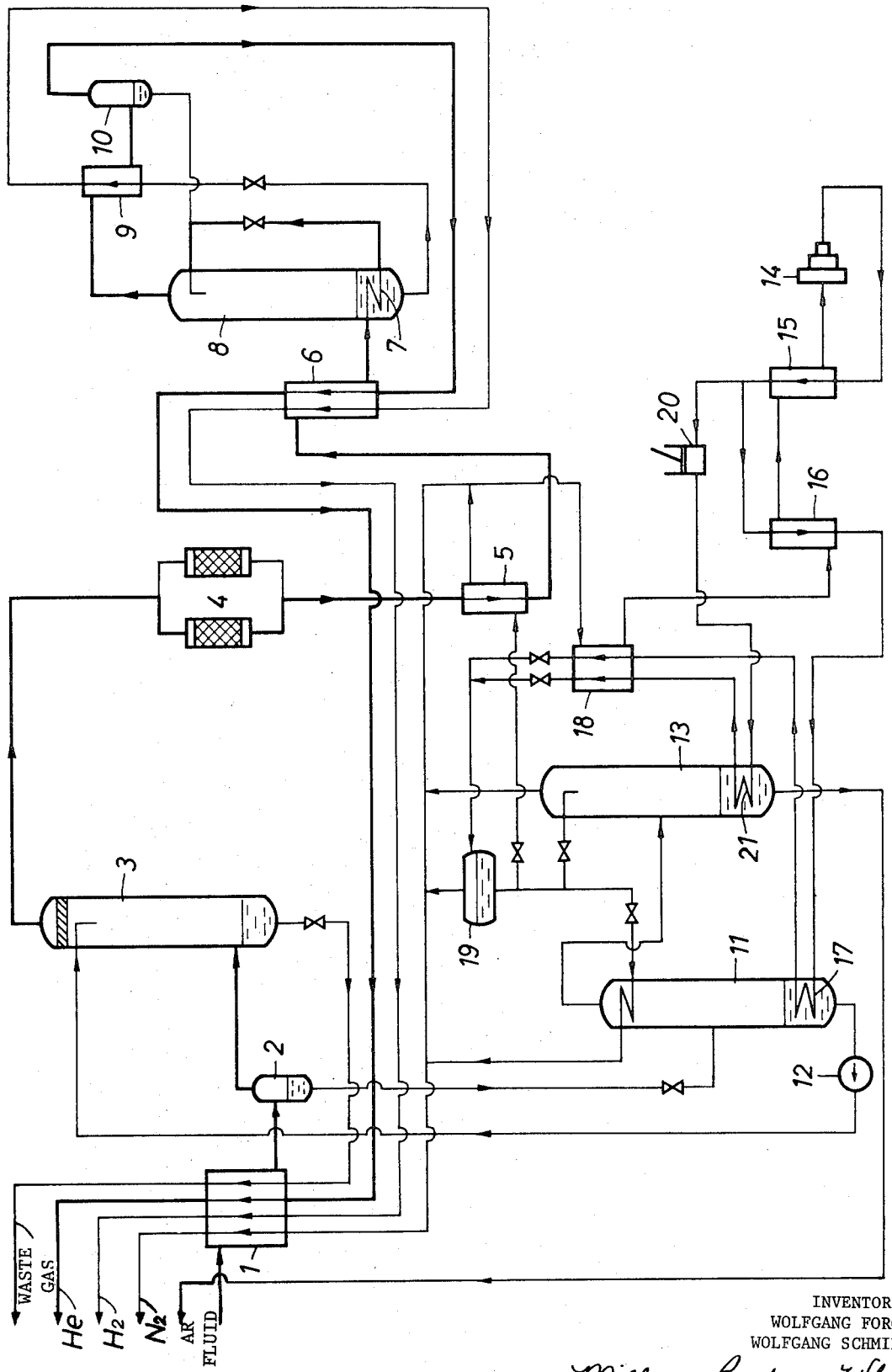

HELIUM-ENRICHED HELIUM-HYDROGEN MIXTURE USING METHANE TO SCRUB OUT RESIDUAL NITROGEN

BACKGROUND OF THE INVENTION

This invention relates to a low temperature system for producing a helium-enriched helium-hydrogen mixture, and as such, is related to our simultaneously filed other applications on the same subject.

Almost all of the helium requirements of the Western World are presently supplied by extracting helium from helium-bearing natural gas found in the United States. The natural gas is cooled to a sufficiently low temperature to condense out methane, the remaining separated gas being generally a 70-30 mixture of helium and nitrogen and called crude helium. Unless nitrogen removal is specifically required to adjust the thermal value of the natural gas, it is apparent that the low-temperature methane liquefaction and gas separation is conducted exclusively for the purpose of obtaining helium. Because this is a relatively costly procedure, it can be justified only in those cases where the concentration of the helium in the natural gas is several thousand parts per million, as is the case of United States natural gas.

Inasmuch as extraction of helium from natural gases having a low helium concentration has not been profitable, the enormous industrial and domestic uses of such natural gases have resulted in an irreversible loss of the helium contained therein. Furthermore, since the yearly consumption of helium will increase in the future, and the supply of helium-rich natural gas will decrease, it would be highly desirable to provide an economic method for producing helium from low helium-content natural gases.

SUMMARY OF THE INVENTION

It is a principal object of this invention to provide a novel and relatively inexpensive system for the production of helium from natural gases having a relatively low helium concentration.

Upon further study of the specification and appended claims, other objects and advantages of the present invention will become apparent.

These objects are attained by employing, as the starting material, a helium-containing vent gas from an ammonia synthesis plant, partially condensing the vent gas to remove a liquid fraction of methane, argon and the major portion of the nitrogen contained therein; scrubbing out residual gaseous nitrogen with liquid methane obtained by rectifying the liquid fraction formed during the partial condensation; adsorbing any methane entrained by the nitrogen free scrubbed gas by means of adsorbers; and partially condensing the resultant mixture of hydrogen and helium free of nitrogen and methane in order to condense and separate the major portion of hydrogen therefrom.

The success of this invention results from the fact that the noble gases present in the hydrogen-nitrogen synthesis gas exhibit an inert behavior during the ammonia synthesis and build up in concentration during the synthesis cycle. The same holds true for methane unreacted during the cracking step, which passes into the ammonia synthesis cycle together with the hydrogen-nitrogen mixture. Because it is, for practical purposes, necessary to prevent an excessive increase in the partial pressure of these non ammonia-producing gases in the reactor, a calculated amount of gas must be continuously vented from the synthesis cycle. The helium concentration in this vent gas is more than ten times as high as in the natural gas employed and the other noble gases, e.g., argon, are similarly enriched therein. These noble gases stem not only from the natural gas but also from the air added during the cracking of the natural gas in accordance with the steam-reforming process, to the secondary reformer, or from the oxygen added during the cracking step in accordance with the partial oxidation process.

A principal advantage of this invention is that it is possible to recover helium without condensing the natural gas, as in previous processes. Furthermore, due to the increased helium concentration in the vent gases, the work and energy requirements for separating helium are lessened so that the helium values of natural gases low in helium can be extracted economically. In addition, this invention not only provides for the extraction of helium from the vent gas of an ammonia synthesis plant, but it also provides for the recovery of argon contained in the vent gas, as well as for the recovery of high purity hydrogen, which can be recycled to the ammonia synthesis plant. Accordingly, the low temperatures involved in the enrichment of the helium containing vent gas are also beneficially employed for the recovery of argon and hydrogen.

As one preferred specific embodiment of this technique, liquid hydrogen formed during the partial condensation step is further treated in a stripping column to recover an enriched gaseous helium product.

As another preferred embodiment, it is especially advantageous to conduct the partial condensation of the hydrogen in two stages. In the first stage, condensed liquid and the gas in equilibrium therewith are separated in a column wherein the helium dissolved in the liquid hydrogen is simultaneously stripped off. In the second stage, the overhead from the stripping column is partially condensed, yielding a hydrogen liquid and a helium-enriched helium-hydrogen mixture. It is then even more advantageous to employ said hydrogen liquid derived from the overhead as reflux for the stripping column.

Suitably, the enriched helium-hydrogen mixture obtained from the second partial condensation is warmed countercurrently to gaseous streams to be cooled, and then reacted with oxygen to remove hydrogen in the form of $H_2O$. The thus-obtained raw helium is then freed, preferably by adsorption at a low temperature, from residual higher-boiling impurities, particularly neon.

The apparatus for conducting the process of this invention comprises a plant for the cracking of helium-containing natural gas, a plant for obtaining synthesis gas from the cracking gas, and an ammonia synthesis plant are connected in series. A conduit for the vent gas is branched off from the synthesis cycle and is piped via at least one countercurrent heat exchanger, with a phase separator for removing the liquid formed by partial condensation, said liquid containing, primarily, nitrogen, argon, and methane. The head of the phase separator is piped to the lower section of a methane scrubbing column, and the sump of the phase separator is pumped to a rectifying column. From the sump of the rectifying column, a conduit for liquid methane is piped to the head of the methane scrubbing column. A conduit is provided for withdrawing scrubbed gas from the methane scrubbing column, and in this conduit are incorporated methane adsorbers and at least one additional countercurrent heat exchanger, said conduit terminating in the upper section of a helium-hydrogen separating column. At the sump of the latter column, a conduit is provided for withdrawing highly pure hydrogen, and at the head of the column, there is provided a conduit for recovering a gaseous helium-enriched helium-hydrogen mixture.

BRIEF DESCRIPTION OF THE DRAWING

The low-temperature separation of vent gas from a synthesis cycle of an ammonia synthesis plant is schematically illustrated in the attached drawing, the synthesis gas having been derived from natural gas having a helium content of 400 p.p.m. The vent gas, after having been freed from water and ammonia, has the following composition in mol percent: 0.4% He; 51.5% $H_2$; 21.7% $N_2$; 8.0% Ar; and 18.4% $CH_4$.

DETAILED DESCRIPTION OF THE EMBODIMENT

The raw gas, freed from ammonia and water, is cooled to about 85° K. and partially condensed in the heat exchanger 1 at a pressure of about 45 bar, thereby warming cold separation products. The thus-formed condensate is separated from the raw gas stream in phase separator 2, and the gas stream in equilibrium therewith is to the bottom of the methane scrubbing column 3 at a point above the liquid in the sump. From the head of this scrubbing column, a substantially nitrogen-free gas is withdrawn at about 91° K. which contains, in addition to hydrogen, helium, and small amounts of neon, about 1 molar percent of entrained methane. Since the methane would be otherwise precipitated as a solid during the additional cooling steps, it is separated from the raw gas by conventional interchangeable adsorbers 4, the adsorbent material being, for example, molecular sieves or silica gel.

The resultant gas, now free of methane, is cooled to about 85° K. in heat exchanger 5 against nitrogen evaporating under a pressure of about 1 to 2 atm. abs. The gas is then further cooled to about 33° K. in heat exchangers 6 and 7 in heat exchange against cold separation products and against vaporizing sump liquid withdrawn as liquid from the helium-hydrogen stripping column 8. The resultant cooled partially condensed gas is expanded down to about 9 bar and introduced to the head of stripping column 8. The head product withdrawn from this column is cooled to about 25° K. in the heat exchanger 9, thereby partially condensing same, and separated in phase separator 10. The resultant condensate is introduced, in the same manner as the expanded cold gas, as reflux liquid to the column 8. The gas withdrawn from phase separator 10, composed of about 50 percent of helium and 50 percent of hydrogen, is warmed in the countercurrent heat exchangers 6 and 1 and fed to a helium fine-purification plant. From the sump of the stripping column 8, extremely pure hydrogen product is withdrawn, expanded, and vaporized in the heat exchanger 9 against overhead product, and is then warmed in the heat exchangers 6 and 1. The major portion of the pure hydrogen product is required for the regeneration of the absorbers 4, and as a result, the final purity of major quantity of hydrogen is about 99 molar percent.

The condensate from phase separator 2, consisting essentially of nitrogen, argon, and methane, is expanded into methane-fractionating column 11. The sump liquid withdrawn from this column, highly pure methane, is conveyed, by means of pump 12, through a cooler (not shown) and then to the head of the methane scrubbing column 3.

The overhead product of the methane-fractionating column 11, a mixture of nitrogen and argon, is fractionated in argon-nitrogen fractionating column 13. From the sump of the latter column, high-purity liquid argon is withdrawn and at the head, gaseous nitrogen. A portion of this nitrogen is warmed in heat exchanger 1 and is available as a product.

The other portion of nitrogen withdrawn from column 13 is warmed in the refrigeration cycle in countercurrent heat exchangers 18, 16, and 15 and then compressed from 1.1 bar to about 195 bar by the high-pressure nitrogen compressor 14. This high-pressure nitrogen, after being cooled in countercurrent heat exchanger 15, is, in part, expanded to about 7 bar, by means of the reciprocating expansion machine 20. The resultant cooled nitrogen gas is still sufficiently warm to function as reboiler heat for column 13; thus, gas is passed to the evaporator tubes in the sump of said column. The resultant condensed nitrogen is then subcooled in heat exchanger 18, and expanded into the liquid nitrogen collecting tank 19.

The other part of the high-pressure nitrogen leaving heat exchanger 15, is further cooled in heat exchanger 16, but still is sufficiently warm to act as heating fluid for the evaporator 17 in the methane fractionating column 11. After having been condensed in column 11, the nitrogen liquid is subcooled in the countercurrent heat exchanger 18, and then expanded into nitrogen collecting tank 19. From the nitrogen collecting tank 19, liquid nitrogen is passed as reflux to the nitrogen-argon separating column 13. The liquid nitrogen likewise serves as a refrigerant for the condenser of the methane fractionating column 11, the raw gas cooler 5, and optionally other smaller refrigerant consuming streams.

With a helium concentration in the natural gas of only 400 p.p.m. and a feed rate of about 100,000 $Nm^3/h$. (corresponding to a plant capacity of around 2,000 tons per day of ammonia), it is possible for this invention to produce about 300,000 $Nm^3$ of helium per year. With an increasing concentration of helium in the natural gas, a correspondingly greater amount of helium can be produced, with the initial investment and the operating costs remaining almost the same.

This invention is especially useful when employed with natural gas having at least 100, preferably at least 300 p.p.m. of helium. In such cases, the vent gases have the following composition range, on a molar percent basis:

$H_2$ — 40 – 60
$N_2$ — 10 – 30
Ar — 5 – 15
$CH_4$ — 15 – 25
He — at least 0,1 preferably at least 0,3

As compared to our simultaneously filed application using regenerators, it is seen that there is no need in the present system for the high pressure hydrogen cycle compression, the vacuum nitrogen compression, and the heat transfer surfaces related thereto. Furthermore, the switch valves for a regenerator section are much more complicated than those for the adsorber section 4.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing a helium-rich helium-hydrogen mixture, comprising:
   using as the starting material a vent gas from an ammonia synthesis plant, said gas comprising nitrogen, hydrogen, methane, argon and helium;
   a. partially condensing said vent gas to liquefy methane and argon and the major portion of the nitrogen;
   b. separating resultant liquid from gas in equilibrium therewith;
   c. scrubbing resultant equilibrium gas with liquid methane derived from step (a) to remove residual nitrogen;
   d. passing resultant substantially nitrogen-free gas through an adsorber to remove residual gaseous methane;
   e. partially condensing resultant substantially nitrogen-free and substantially methane-free gas from the adsorber to condense out and separate a major portion of the hydrogen; and
   f. separating resultant helium-enriched hydrogen-helium mixture from said condensed major portion of hydrogen.

2. A process according to claim 1, further comprising passing said condensed major portion of hydrogen to a stripping column, said separating residual dissolved helium therefrom.

3. A process according to claim 1, wherein the step of partially condensing substantially nitrogen-free gas from the adsorber is conducted in two stages; in the first stage partially condensing hydrogen liquid containing dissolved helium, and separating said liquid from gas in equilibrium therewith in a stripping column while simultaneously stripping said dissolved helium from said hydrogen liquid, and in the second stage withdrawing a helium-hydrogen mixture as overhead from said stripping column, and partially condensing said mixture to form additional liquid hydrogen and a helium-enriched helium-hydrogen gas.

4. A process according to claim 3, further comprising recycling said additional liquid hydrogen to the stripping column as reflux.

5. A process as defined by claim 1, further comprising the step of rectifying the resultant liquid mixture of methane, argon and nitrogen from step (a) to produce substantially pure liquid methane which is employed in step (c).

6. A process as defined by claim 4, further comprising the step of rectifying the resultant liquid mixture of methane, argon and nitrogen from step (a) to produce substantially pure liquid methane which is employed in step (c).

7. A process as defined by claim 1, wherein said vent gas has the following molar percent composition: nitrogen 10–30 percent, hydrogen 40–60 percent, methane 15–25 percent, argon 5–15 percent, and helium at least 0.1 percent.

8. A process as defined by claim 6, wherein said vent gas has the following molar percent composition: nitrogen 10–30 percent, hydrogen 40–60 percent, methane 15–25 percent, argon 5–15 percent, and helium at least 0.3 percent.

9. A process as defined by claim 7, wherein the helium in the vent gas is derived from natural gas having at least 100 parts per million of helium.

10. A process as defined by claim 8, wherein the helium in the vent gas is derived from natural gas having at least 300 parts per million of helium.

11. Apparatus for producing a helium-enriched helium-hydrogen mixture, said apparatus comprising a plant for cracking of helium-containing natural gas to produce hydrogen, a plant for producing synthesis gas from the hydrogen cracking gas, and an ammonia synthesis plant connected in series;
    a branch for withdrawing vent gas from the ammonia synthesis plant;
    at least one countercurrent heat exchanger in communication with said branch for partially condensing vent gas;
    a phase separator in communication with said heat exchanger for separating a condensate of argon, methane and nitrogen from said vent gas, said phase separator having a head portion and a bottom portion;
    a fractionating column in communication with the bottom portion of said phase separator for separating liquid methane from argon and nitrogen; and a conduit communicating the sump of the fractionating column with the head of the scrubbing column for employing purified methane as scrubbing liquid;
    a scrubbing column in communication with said head of said phase separator for scrubbing out residual nitrogen from the vent gas with said purified liquid methane;
    adsorber means in communication with the top of said scrubbing column for removing residual methane from said vent gas; at least one additional countercurrent heat exchanger in communication with said adsorber means for partially condensing resultant nitrogen-free helium-hydrogen gaseous mixture;
    a stripping column having a head section and a sump;
    a conduit connecting said at least one additional counter-current heat exchanger with said head section of said stripping column; and
    conduit means for withdrawing liquid hydrogen from the sump of the stripping column, and for withdrawing a gaseous helium-enriched helium-hydrogen mixture from the top of the column; and
    conduit means for effecting said communications.

* * * * *